(12) United States Patent
Raad

(10) Patent No.: US 10,243,424 B2
(45) Date of Patent: Mar. 26, 2019

(54) MAST-MOUNTED AIRCRAFT GENERATOR

(71) Applicant: OECO, LLC, Milwaukie, OR (US)

(72) Inventor: Bernard Anthony Raad, West Linn, OR (US)

(73) Assignee: OECO, LLP, Milwaukie, OR (US)

( * ) Notice: Subject to any disclaimer, the term of this patent is extended or adjusted under 35 U.S.C. 154(b) by 1027 days.

(21) Appl. No.: 14/255,078

(22) Filed: Apr. 17, 2014

(65) Prior Publication Data

US 2014/0312722 A1 Oct. 23, 2014

Related U.S. Application Data

(60) Provisional application No. 61/813,619, filed on Apr. 18, 2013.

(51) Int. Cl.

| | | |
|---|---|---|
| *H02K 7/14* | (2006.01) | |
| *H02K 5/18* | (2006.01) | |
| *B64D 15/12* | (2006.01) | |
| *H02K 21/26* | (2006.01) | |
| *H02K 7/00* | (2006.01) | |
| *H02K 7/18* | (2006.01) | |
| *H02K 11/042* | (2016.01) | |
| *H02K 5/04* | (2006.01) | |
| *H02K 9/22* | (2006.01) | |
| *H02K 16/00* | (2006.01) | |
| *B64C 27/12* | (2006.01) | |
| *B64C 27/32* | (2006.01) | |

(52) U.S. Cl.
CPC ............... *H02K 5/18* (2013.01); *B64D 15/12* (2013.01); *H02K 5/04* (2013.01); *H02K 7/006* (2013.01); *H02K 7/1807* (2013.01); *H02K 9/22* (2013.01); *H02K 11/042* (2013.01); *H02K 21/26* (2013.01); *B64C 27/12* (2013.01); *B64C 27/32* (2013.01); *H02K 16/00* (2013.01); *H02K 2213/12* (2013.01)

(58) Field of Classification Search
CPC .......... H02K 5/18; H02K 21/26; H02K 7/006; H02K 7/1807; H02K 11/042; H02K 5/04; H02K 9/22; H02K 7/14; H02K 11/00; H02K 16/00; H02K 2213/12; B64D 15/12; B64C 27/12; B64C 27/32
USPC .................................................. 310/179–210
See application file for complete search history.

(56) References Cited

U.S. PATENT DOCUMENTS 3,997,131 A * 12/1976 Kling ...................... B64C 27/10
 244/17.19
4,472,649 A * 9/1984 Namba ................ H02K 11/042
 310/112

(Continued)

FOREIGN PATENT DOCUMENTS

EP 2390989 A2 11/2011
EP 2528203 A1 11/2012

*Primary Examiner* — Naishadh N Desai
(74) *Attorney, Agent, or Firm* — Quarles & Brady LLP

(57) ABSTRACT

A generator with relatively high (Length/Diameter) aspect ratio, which may be mounted within the rotating mast of a helicopter, and which may generate power that is conditioned by a rotating power conditioning unit and delivered to the rotating rotor blades without the use of slip rings, is disclosed. The generator may be arranged to take advantage of the available space within the mast. Temperature of the mast and generator may be controlled by varying the wall thickness of the mast wall and using cooling fins on the mast and a cooling dome.

24 Claims, 10 Drawing Sheets

(56) References Cited

U.S. PATENT DOCUMENTS

| | | | |
|---|---|---|---|
| 5,864,189 A | 1/1999 | Tadao et al. | |
| 6,769,874 B2 | 8/2004 | Arel | |
| 7,750,521 B2 * | 7/2010 | Qu | H02K 7/1823 |
| | | | 310/112 |
| 8,464,511 B1 * | 6/2013 | Ribarov | B64C 11/48 |
| | | | 60/226.1 |
| 8,841,584 B2 * | 9/2014 | Bulin | B64C 11/48 |
| | | | 219/202 |
| 2003/0102749 A1 | 6/2003 | Kuch et al. | |
| 2005/0242233 A1 * | 11/2005 | Battisti | F03D 80/40 |
| | | | 244/58 |
| 2007/0138897 A1 * | 6/2007 | Asaba | H02K 3/47 |
| | | | 310/208 |
| 2009/0289516 A1 * | 11/2009 | Hopewell | F02C 7/32 |
| | | | 310/115 |
| 2010/0127496 A1 * | 5/2010 | Burkholder | F01D 9/065 |
| | | | 290/46 |
| 2011/0024567 A1 * | 2/2011 | Blackwelder | B64D 15/12 |
| | | | 244/134 D |
| 2011/0025067 A1 * | 2/2011 | Cipriani | H02K 7/1823 |
| | | | 290/52 |
| 2011/0259996 A1 * | 10/2011 | Vetters | B64D 27/10 |
| | | | 244/54 |
| 2011/0290942 A1 * | 12/2011 | Imbert | B64D 15/14 |
| | | | 244/134 D |

\* cited by examiner

MAST-MOUNTED AIRCRAFT GENERATOR

CROSS REFERENCE TO RELATED APPLICATIONS

This application relates to, and claims the benefit of the earlier filing date and priority of U.S. Provisional Patent Application No. 61/813,619, filed on Apr. 18, 2013, entitled "Mast-Mounted Generator With Counter-Rotating Stator."

FIELD OF THE INVENTION

The present invention relates to systems and methods for generating electrical power onboard an aircraft, such as a helicopter.

BACKGROUND

Providing electrical power onboard a helicopter, particularly to helicopter rotor blades for deicing, has traditionally required the use of gearbox mounted generators, located remotely from the rotor blades, which transmit electrical power to the rotor blades through slip rings, as shown in FIG. 1. These power generation devices typically suffer from low efficiency and may require frequent maintenance. Accordingly, there is a need for an improved onboard generator for generating electrical power on an aircraft. In particular, there is a need for an improved onboard generator for generating electrical power for rotor blade deicing on a helicopter. Embodiments of the present invention may meet this need by providing a mast-mounted generator which may eliminate the necessity for slip rings by generating the usable power at or near the site of use, i.e., at or near the rotor blades. Some embodiments of the present invention may further incorporate an optional counter-rotating stator in the generator.

SUMMARY OF THE INVENTION

Responsive to the foregoing challenges, Applicant has developed an innovative onboard aircraft electrical generator comprising: a rotary outer housing having a central elongated axis and adapted to drive an aircraft blade assembly, said outer housing having an upper end proximal to the aircraft blade assembly, a lower end distal from the aircraft blade assembly, and a varied cross-sectional thickness at points along the elongated axis; a stator assembly disposed within the outer housing, said stator assembly including an armature element or a field element, and having associated electrical terminals; and a rotor assembly disposed within the stator assembly, said rotor assembly including a field element or an armature element.

Applicant has further developed an innovative onboard aircraft electrical generator comprising: a rotary outer housing adapted to drive an aircraft blade assembly, said outer housing having an elongated axis, an upper end proximal to the aircraft blade assembly, and a lower end distal from the aircraft blade assembly; a stator assembly disposed within the outer housing, said stator assembly including an armature element or a field element, and having associated electrical terminals; and a rotor assembly disposed within the stator assembly, said rotor assembly including a field element or an armature element; and a cooling housing contacting the upper end of the elongated outer housing.

Applicant has still further developed an innovative onboard aircraft electrical generator comprising: a rotary outer housing having a central elongated axis and adapted to drive an aircraft blade assembly, said outer housing having an upper end proximal to the aircraft blade assembly, and a lower end distal from the aircraft blade assembly; a stator assembly disposed within and fastened to the outer housing, said stator assembly including an armature element or a field element, wherein said stator assembly extends more than half of a distance between the outer housing upper end and lower end measured along the central elongated axis; and a rotor assembly disposed within the stator assembly relative to the central elongated axis, said rotor assembly including a field element or an armature element.

It is to be understood that both the foregoing general description and the following detailed description are exemplary and explanatory only, and are not restrictive of the invention as claimed.

BRIEF DESCRIPTION OF THE DRAWING

In order to assist the understanding of this invention, reference will now be made to the appended drawings, in which like reference numerals refer to like elements. The drawings are exemplary only, and should not be construed as limiting the invention.

DETAILED DESCRIPTION OF PREFERRED EMBODIMENTS OF THE INVENTION

Figure 1:
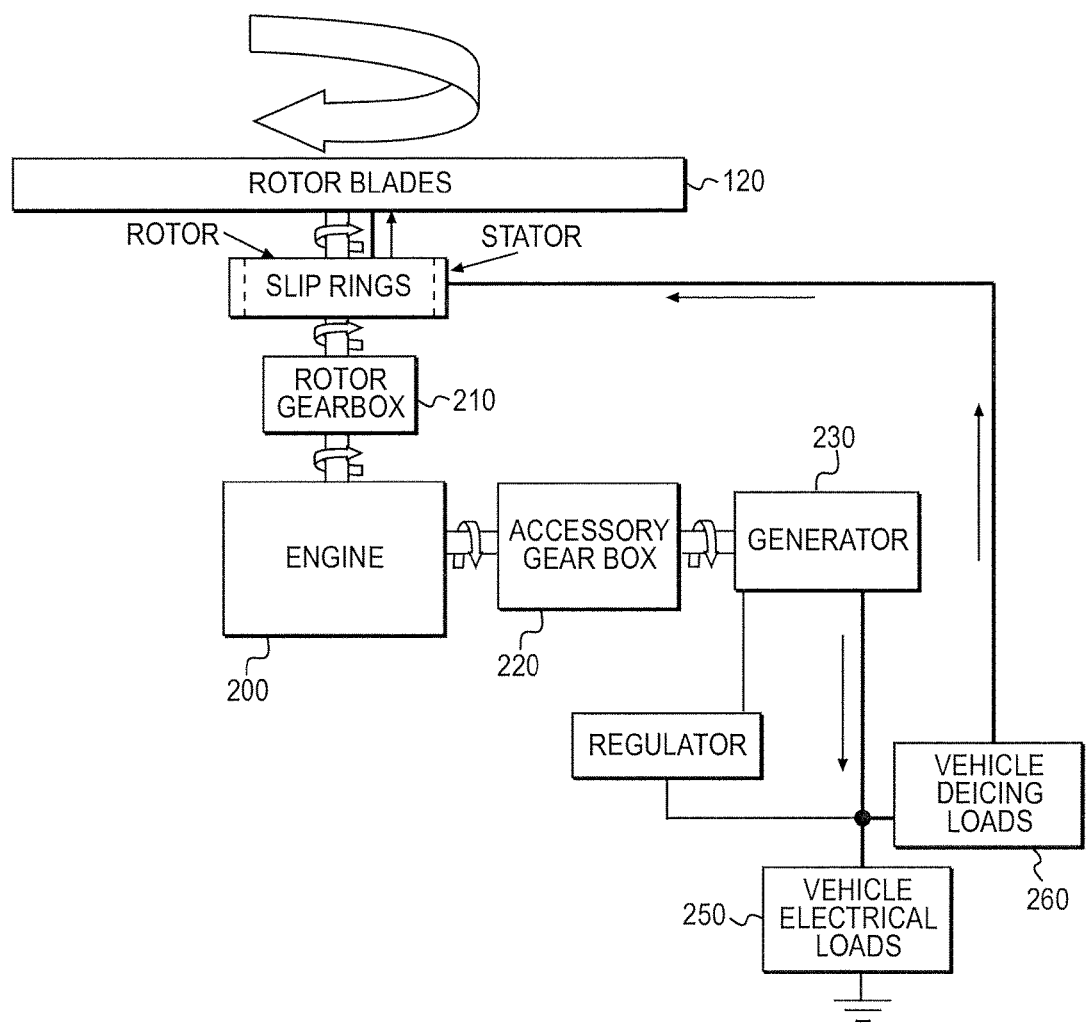
FIG. 1 is a top level block diagram of a prior art generator.
Figure 2:
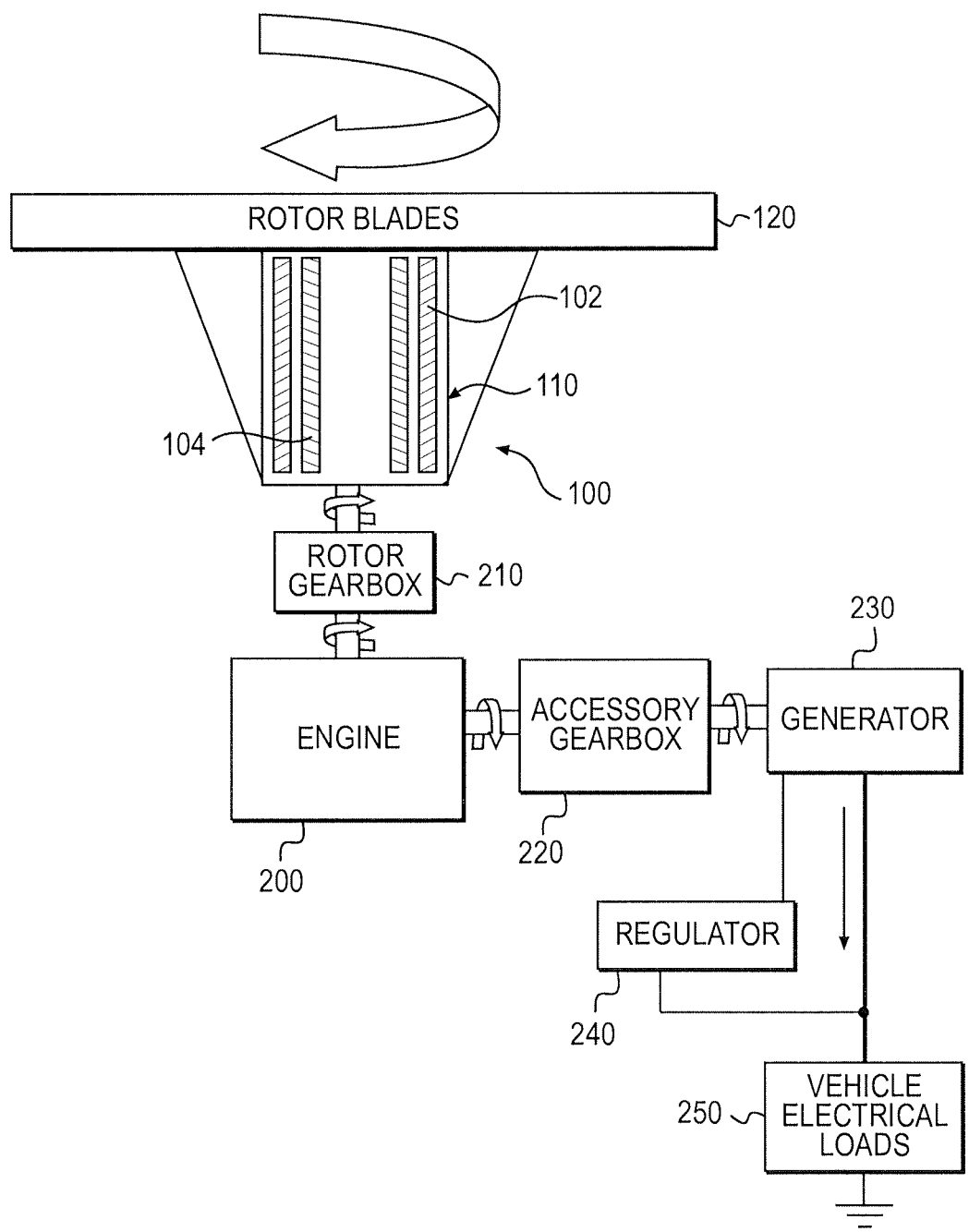
FIG. 2 is a top level block diagram of an embodiment of the present invention.
Figure 3:
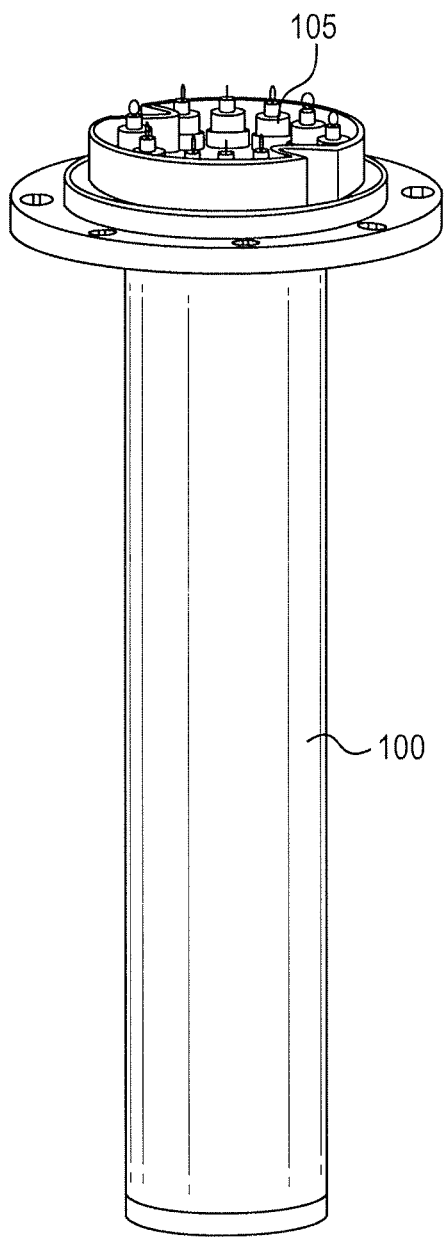
FIG. 3 is a pictorial illustration of a mast-mounted generator configured in accordance with an embodiment of the present invention.

Reference will now be made in detail to embodiments of the present invention, examples of which are illustrated in the accompanying drawings. With reference to FIG. 2, in a first embodiment of the invention, a dedicated deicing generator 100 is mounted in or on the main mast 110 of a helicopter. The generator 100 may include an outer stator assembly 102 which serves as an armature and which is disposed about an inner rotor assembly 104 which serves as a field element. The electrical output of the generator 100 may be provided to resistive heating elements (not shown) associated with the rotor blades 120 without the use of slip rings by directly wiring the stator assembly 102 to the heating elements. The heating elements may prevent or melt the formation of ice on the rotor blades 120.

With continued reference to FIG. 2, the generator 100 may be operatively connected to a rotor gearbox 210 and a main engine 200. The main engine 200 may be operatively connected to an accessory gearbox 220, which in turn may be operatively connected to a main generator 230 used to generate electrical power other than that used for deicing. The main generator 230 may be operatively connected to a regulator 240 and helicopter or vehicle loads 250 other than those used for deicing.

With reference to FIGS. 3-6, the main mast 110 may include a main shaft 101 disposed in a center region of the main mast. The outer most portion of the main mast 110 may be defined by an elongated, generally cylindrical, outer housing 103 which may be coaxial with the main shaft 101. The outer housing 103 may be connected to the rotor blades 120 at an upper end and may be rotated by the main engine 200 through connection to the rotor gearbox 210 at a lower end. The electrical generating components of the generator 100 may be disposed partially or entirely within the outer housing 103.

The electrical generating components of the generator 100 may include a stator assembly 102 disposed within the elongated outer housing 103. The stator assembly 102 may comprise one or more stator elements disposed concentrically about the main rotary shaft 101 between an upper bearing assembly 107 and a lower bearing assembly 108. The upper and lower bearing assemblies 107 and 108 may permit the stator assembly 102 to be rotated with the outer housing 103. Preferably the stator assembly 102 may be rotated by the rotor gearbox 210 at the same rotational speed as the outer housing 103, and thus at the same rotational speed as the rotor blades 120. The synchronous rotation of the stator assembly 102 and the rotor blades 120 may facilitate the electrical connection of the generator 100 (through the stator assembly 102) to the rotor blade heating elements without the need for slip rings.

The rotor assembly 104 may be disposed between the stator assembly 102 and the main shaft 101. The rotor assembly 104 may comprise one or more field elements, provided by a permanent magnet or field winding, disposed concentrically about the main shaft 101. Thus, it is appreciated that the generator 100 may be implemented as a homopolar generator or as a wound field generator without departing from the intended scope of the present invention. A separate, optional, driving mechanism may rotate the inner rotor assembly 104 counter to the rotation direction of the stator assembly 102, which may enhance the effect (electricity generation) from rotation.

FIGS. 3-4 and 7-10 illustrate a preferred embodiment of the present invention in which the mast mounted deicing generator 100 may have a high length to diameter aspect ratio. Specifically, the generator 100 may have a ratio of the axial length of the electrical generating components (i.e., stator assembly 102 and/or rotator assembly 104) to the diameter of the outer surface of the stator assembly which results in the overall axial length of the stator assembly and/or rotor assembly being over half of the distance between the outer housing upper end and lower end.

Figure 4:
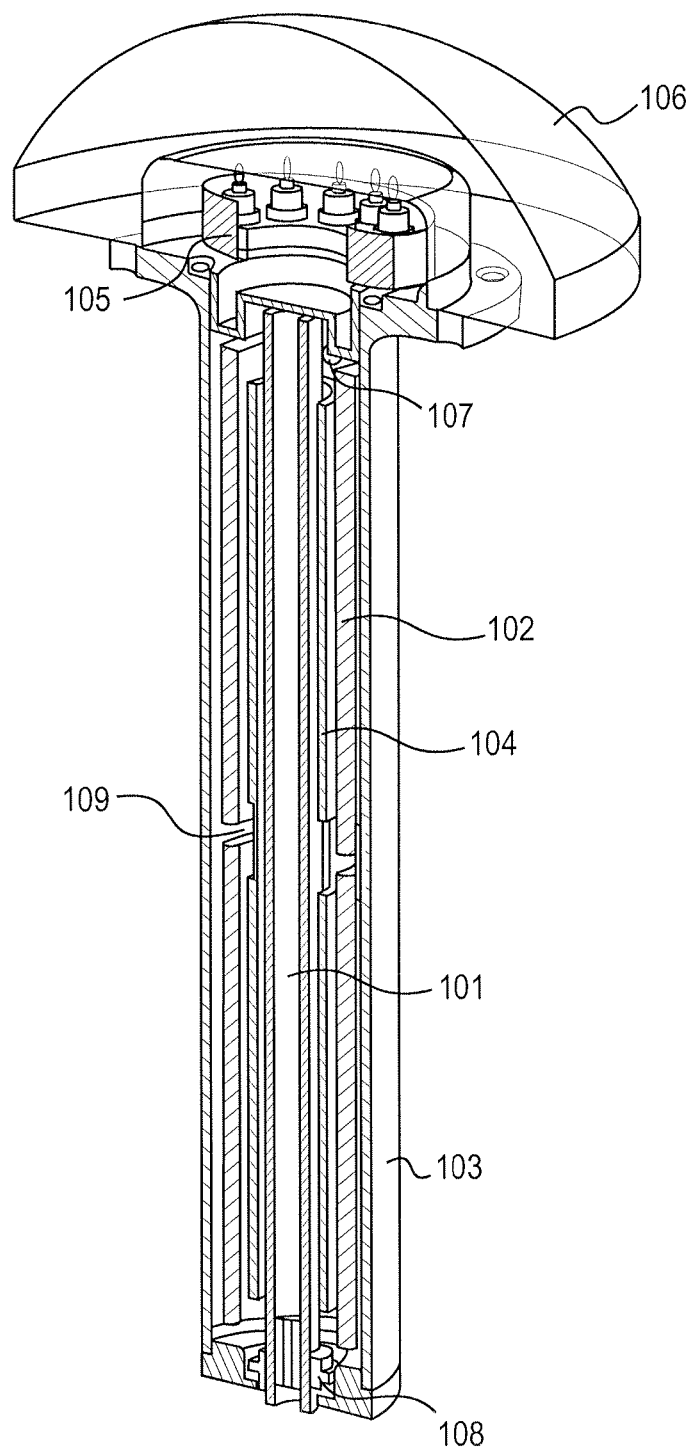
FIG. 4 is a longitudinal cross-sectional view showing the internal structure of the embodiment of the present invention shown in FIG. 3.

For example, in a non-limiting embodiment, a 20 kW-capable generator may have a diameter of approximately 3.7 inches and an axial length of approximately 18 inches. For such high aspect ratio generators, a permanent magnet rotor assembly 104 may be relatively easy to manufacture, however, the stator assembly 102 armature may be difficult to wind. Therefore, a split stator assembly 102 configuration may be provided that features two or more stators vertically stacked and connected either in series or in parallel, as shown in FIG. 4. To reduce DC ripple when using such a configuration, two three-phase stators, displaced from each other by 30° electrically, may be used. In a preferred embodiment, the leads from each stator assembly 102 armature may be connected to one of the two diode bridges, which may be coupled to produce the required output. Although what is described above is the preferred embodiment, it is to be understood that a similar configuration may be obtained using two six-phase armatures connected in series.

With continued reference to FIG. 4, an optional mid-point bearing assembly 109 may be provided between the upper and lower bearing assemblies 107 and 108 to stiffen the system for high aspect ratio embodiments. It is appreciated for a generator 100 with a high aspect ratio, it may be preferred to make the outer stator assembly 102 a field element and the inner rotor assembly 104 an armature element.

Figure 5:
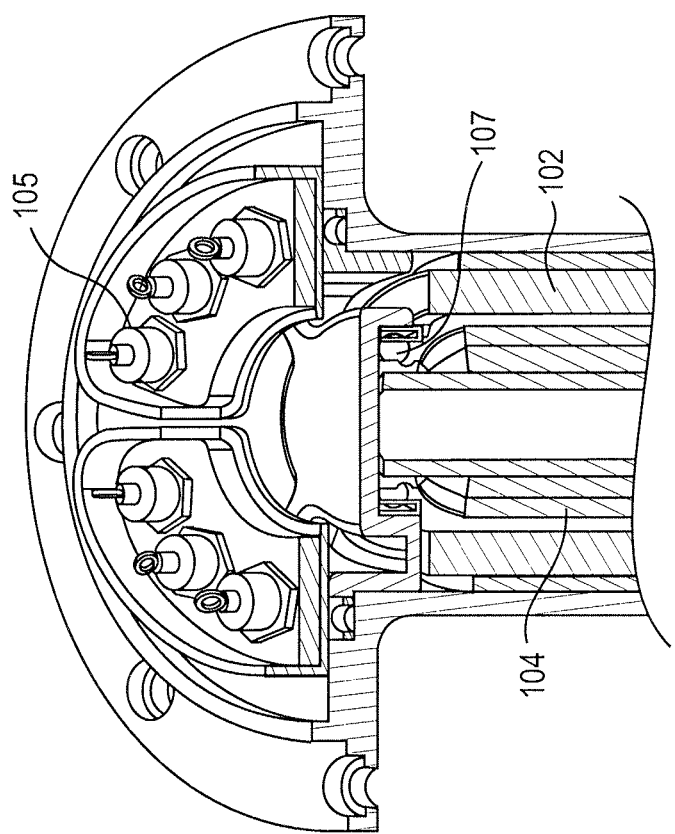
FIG. 5 is a longitudinal cross-sectional view showing the bridge detail and individual rectifiers of the embodiment of the present invention shown in FIGS. 3-4.
Figure 6:
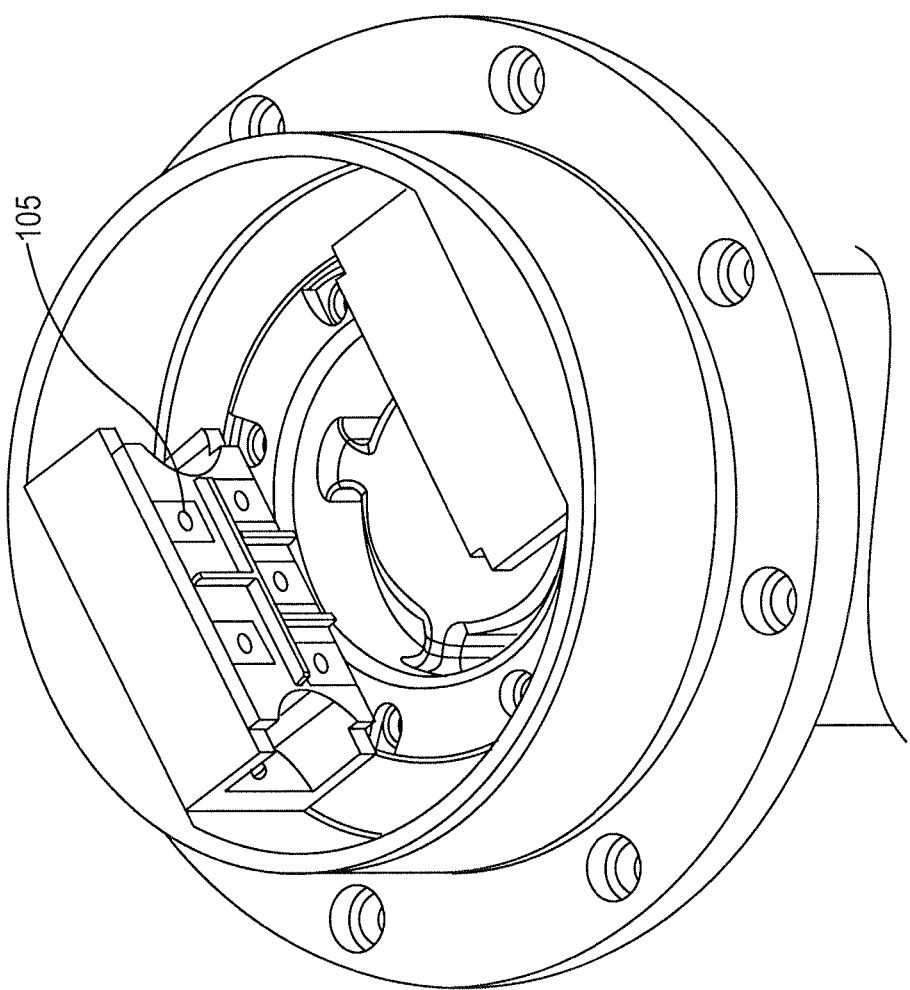
FIG. 6 is a pictorial view of the modular bridge rectifiers provided in an embodiment of the present invention.

With reference to FIGS. 4-6 the main mast 110 may further include one or more power conditioning elements, such as rectifiers 105, and a cooling dome 106 provided at the upper end of the main mast. The rectifiers 105 may rotate with the main mast 110 and the stator assembly 102, thereby permitting direct electrical connection between the rectifiers and the stator assembly 102 and between the rectifiers and the rotor blade heating elements. While the rectifiers 105 may be included to convert the generated AC power into DC power for aircraft consumption, it is to be understood that the generator 100 may be used to produce non-rectified output of AC without departing from the intended scope of the present invention.

Figure 7:
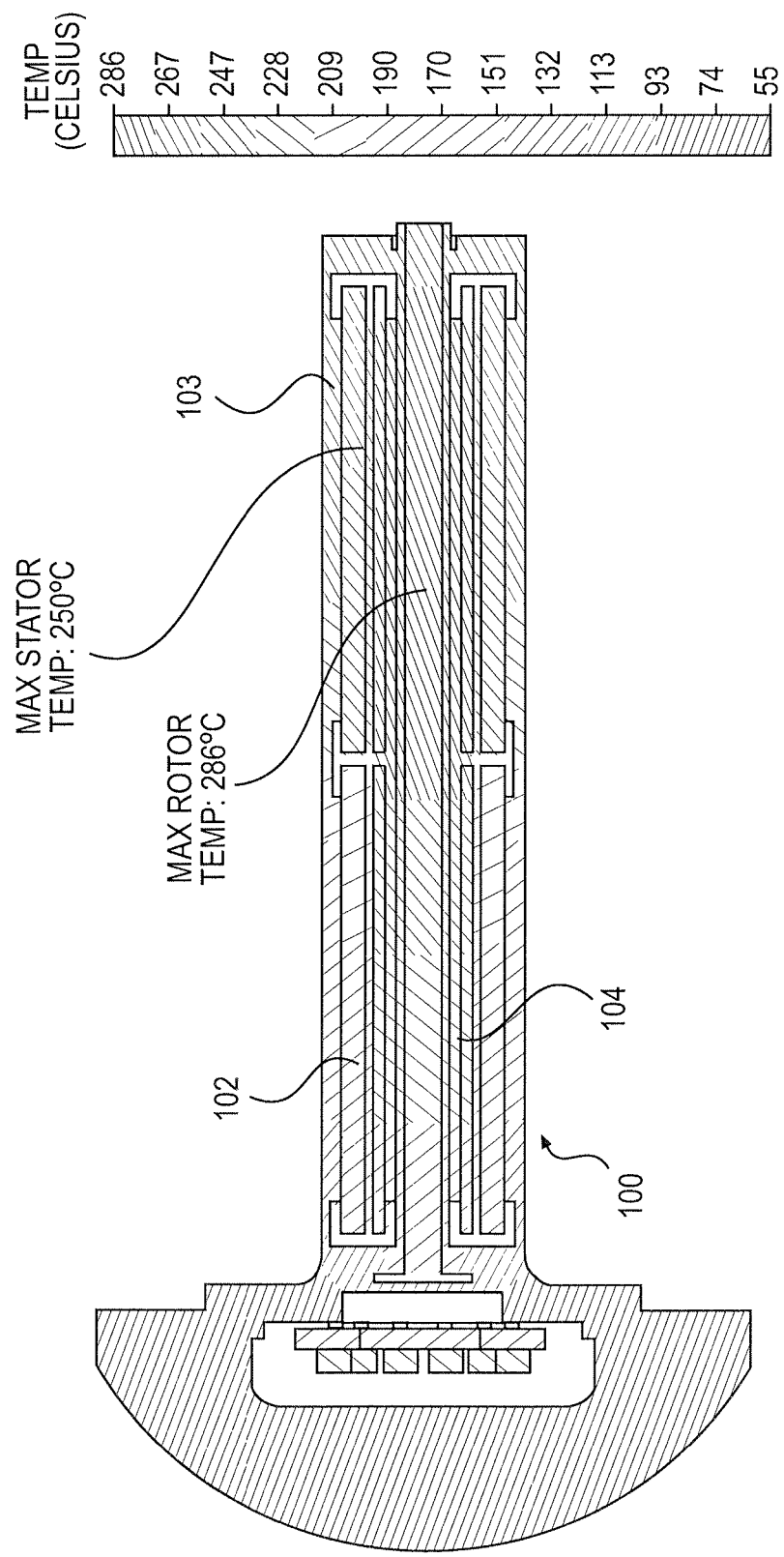
FIG. 7 is a thermal map illustration of a cylindrical housing generator configured in accordance with an embodiment of the present invention.
Figure 9:
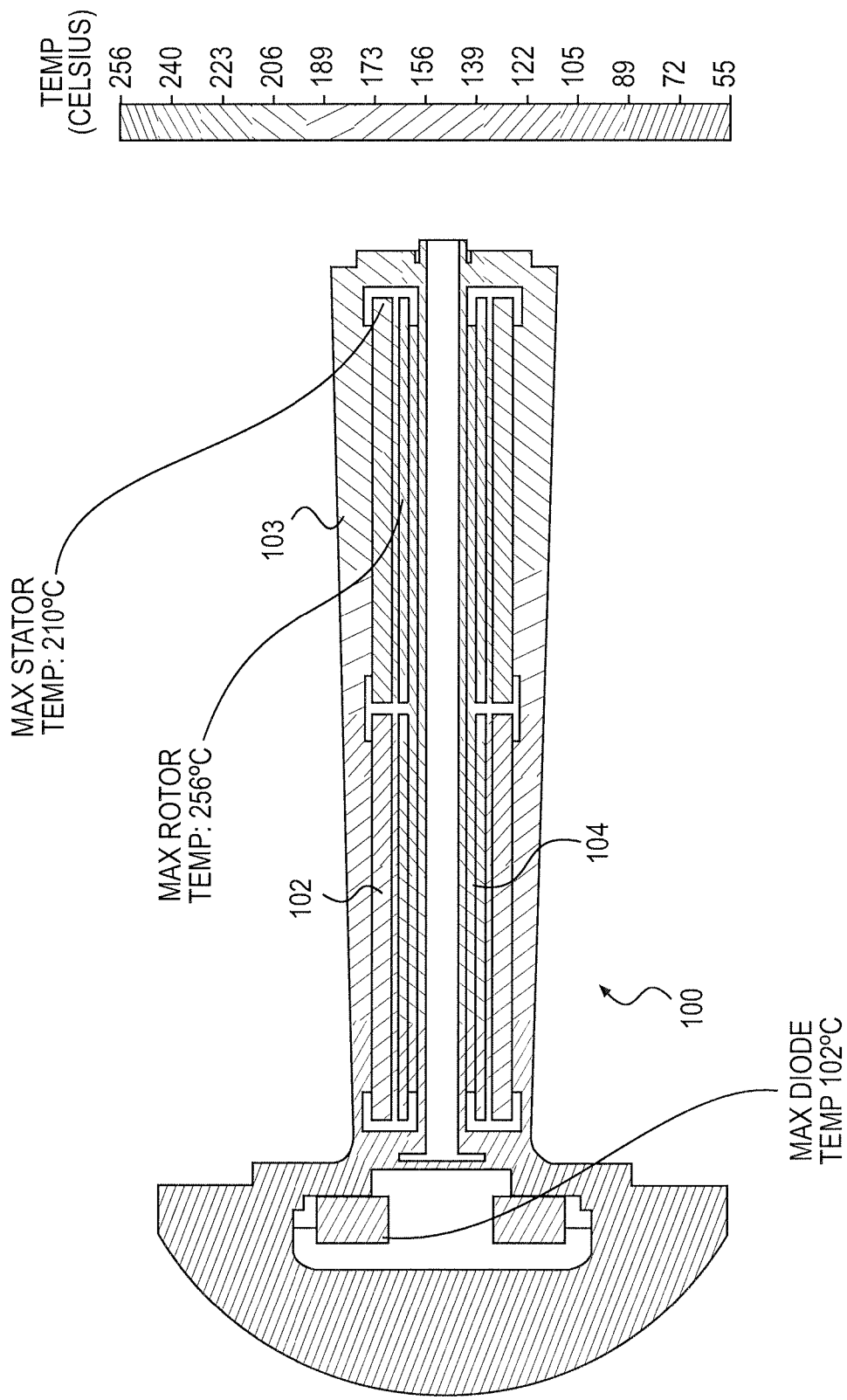
FIG. 9 is a thermal map illustration of a tapered housing generator configured in accordance with an embodiment of the present invention.
Figure 10:
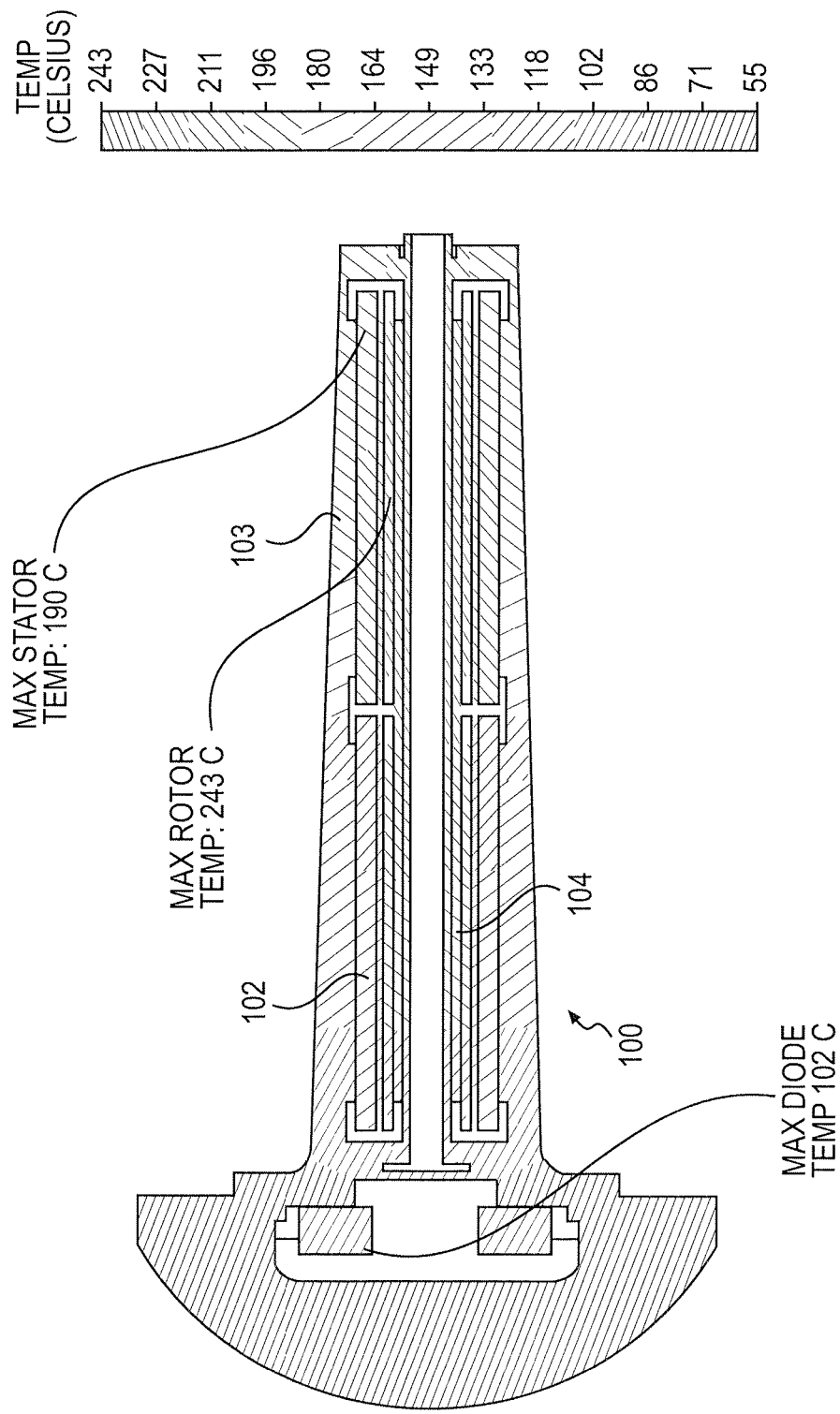
FIG. 10 is a thermal map illustration of a reverse-tapered housing generator configured in accordance with an embodiment of the present invention.

Maintaining an acceptable temperature profile for the generator 100 may require special design of the main mast 110 and inclusion of the cooling dome 106. Heat generated as a result of the operation of the generator 100 may be extracted by conduction through the main mast 110 outer housing 103, which is preferably aluminum, to the cooling dome or housing 106, which is also preferably aluminum, mounted on top of the main mast. The length of the generator 100, as compared with its diameter, may cause one end to attain a substantially different temperature than the other while in operation. This is exemplified by thermal analysis, the results of which are depicted in FIGS. 7, 9 and 10 (for different embodiments).

Figure 8:
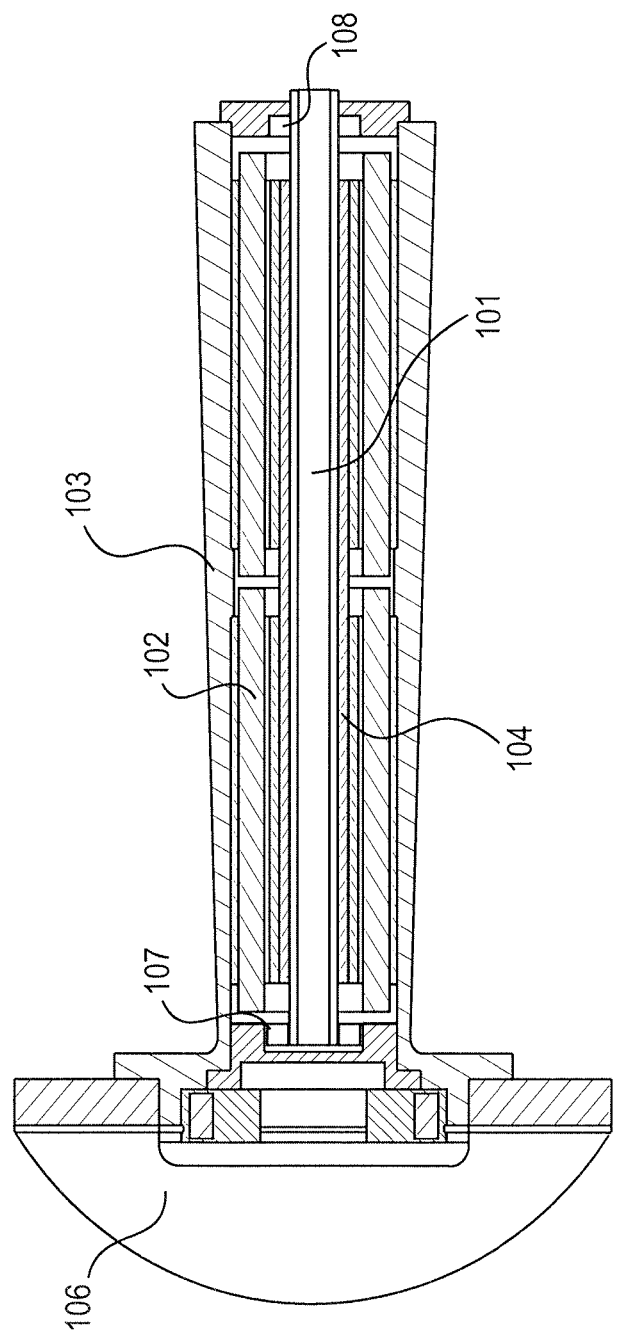
FIG. 8 is a cross-sectional view of a generator having a tapered housing configured in accordance with an embodiment of the present invention.

Due to the fact that differential temperature of the generator 100 along its axis may cause differential thermal expansion issues, different outer housing 103 wall thickness tapers may be used to control the temperature variation along such axis. For example, by implementing a draft angle of 1.5° of increasing wall thickness along part or all of the length of the outer housing 103, the temperatures along the axis of the generator 100 may be substantially evened. FIGS. 7, 9 and 10 illustrate the effect of increased thermal mass as a result of varying the wall thickness of the outer housing 103 along its axial configuration. A reverse taper may also be effective, as shown in FIG. 10, to increase the conduction section. FIGS. 8-9 illustrate a dedicated deicing generator 100 having a tapered outer housing 103, while FIG. 10 illustrates a dedicated deicing generator 100 having a reverse-tapered outer housing 103.

Because the generator 100 is cooled by conduction through the outer housing 103 to the cooling dome or housing 106, the inclusion and location of the rectifiers 105 may pose a challenging problem which may be solved by using modular rectifier bridges whose thermal coefficient (Junction to Base) is known and well-managed. FIG. 6 shows such an arrangement. Temperature management, and specifically cooling, of the generator 100 may be further enhanced by including one or more cooling fins on the outer housing 103 and/or on the cooling dome 106.

It will be apparent to those skilled in the art that variations and modifications of the present invention can be made without departing from the scope or spirit of the invention. For example, the end use of the power generated by the described generator need not be limited to deicing applications. Further, it should be appreciated that the variation of the cross-sectional wall thickness of the outer housing may be varied itself without departing from the intended scope of the present invention so long as such variation provides temperature management, as expressed above. Thus, it is intended that the present invention cover all such modifications and variations of the invention, provided they come within the scope of the appended claims and their equivalents.

What is claimed:

1. An onboard aircraft electrical generator comprising:
    a main mast including a central main shaft and an outer most rotary housing disposed about the central main shaft, said main mast having a lower end spaced from a main engine;
    said outer most rotary housing having a central elongated axis, said outer most rotary housing adapted to drive an aircraft blade assembly, and said outer most rotary housing having an upper end proximal to and connected to the aircraft blade assembly, a lower end distal from the aircraft blade assembly and operatively connected to the main engine, and a varied cross-sectional thickness at points along the elongated axis;
    a first assembly disposed within the outer most rotary housing, said first assembly including an armature element or a field element, and having associated electrical terminals; and
    a second assembly disposed within the first assembly, said second assembly including a field element or an armature element.

2. The electrical generator of claim 1, wherein the outer most rotary housing has a tapered cross-sectional thickness.

3. The electrical generator of claim 2, wherein the outer most rotary housing has a cross-sectional thickness at the lower end which is greater than a cross-sectional thickness at the upper end.

4. The electrical generator of claim 2, wherein the outer most rotary housing has a cross-sectional thickness at the upper end which is greater than a cross-sectional thickness at the lower end.

5. The electrical generator of claim 1, further comprising a rectifier assembly disposed at the upper end of the outer most rotary housing, said rectifier assembly electrically connected to the electrical terminals associated with the first assembly.

6. The electrical generator of claim 1, further comprising a cooling housing contacting the upper end of the outer most rotary housing.

7. The electrical generator of claim 6, further comprising one or more cooling fins extending from the cooling housing.

8. The electrical generator of claim 6, further comprising a rectifier assembly disposed at the upper end of the outer most rotary housing and disposed within the cooling housing.

9. The electrical generator of claim 6, further comprising a modular rectifier bridge disposed at the upper end of the outer most rotary housing and disposed within the cooling housing.

10. The electrical generator of claim 1, further comprising one or more cooling fins extending from the outer most rotary housing.

11. The electrical generator of claim 1, wherein the first assembly includes dual three-phase armature elements electrically displaced from each other by an equal number of degrees.

12. The electrical generator of claim 1, wherein the first assembly includes two armature elements connected in series and spaced longitudinally along the central elongated axis.

13. The electrical generator of claim 12, wherein the two armature elements are six-phase armatures.

14. The electrical generator of claim 1, wherein the first assembly includes two armature elements connected in parallel and spaced longitudinally along the central elongated axis.

15. The electrical generator of claim 1, wherein the second assembly is adapted to rotate in a counter direction to rotation of the first assembly.

16. The electrical generator of claim 1, wherein the first assembly is disposed within and fastened to the outer most rotary housing,
    wherein said first assembly extends more than half of a distance between the outer most rotary housing upper end and lower end measured along the central elongated axis; and
    wherein said second assembly is disposed within the first assembly relative to the central elongated axis.

17. The electrical generator of claim 1, wherein the first assembly includes one or more sets of balanced poly-phase armature elements.

18. The electrical generator of claim 16, wherein the outer most rotary housing has a tapered cross-sectional thickness.

19. The electrical generator of claim 16, wherein the outer most rotary housing has a cross-sectional thickness at the lower end which is greater than a cross-sectional thickness at the upper end.

20. The electrical generator of claim 16, wherein the first assembly includes dual three-phase armature elements electrically displaced from each other.

21. The electrical generator of claim 16, wherein the first assembly includes two armature elements connected in series and spaced longitudinally along the central elongated axis.

22. The electrical generator of claim 21, wherein the two armature elements are six-phase armatures.

23. The electrical generator of claim 16, wherein the first assembly includes two armature elements connected in parallel and spaced longitudinally along the central elongated axis.

24. The electrical generator of claim 16, wherein the second assembly is adapted to rotate in a counter direction to rotation of the first assembly.

* * * * *